United States Patent [19]

Nodes et al.

[11] Patent Number: 4,678,578

[45] Date of Patent: Jul. 7, 1987

[54] FLAT FILTER ELEMENT FOR THE FILTRATION OF FLUIDS

[75] Inventors: Rudolf Nodes, Böblingen; Jürgen Hoffmann, Hardegsen-Ellierode, both of Fed. Rep. of Germany

[73] Assignee: Sartorius GmbH, Fed. Rep. of Germany

[21] Appl. No.: 704,574

[22] Filed: Feb. 22, 1985

[30] Foreign Application Priority Data

Feb. 24, 1984 [DE] Fed. Rep. of Germany ....... 3406735

[51] Int. Cl.$^4$ ............................................. B01D 27/06
[52] U.S. Cl. .................................... 210/445; 210/450; 210/489; 210/493.1; 210/493.5; 55/497
[58] Field of Search ............... 210/493.1, 493.3, 493.5, 210/445, 450, 451, 453, 489, 488, 455, 490, 492; 55/497, 521, DIG. 31

[56] References Cited

U.S. PATENT DOCUMENTS

| 3,243,943 | 4/1966 | Getzin | 210/493.3 |
|---|---|---|---|
| 3,520,803 | 7/1970 | Iaconelli | 210/640 |
| 3,815,754 | 6/1974 | Rosenberg | 55/497 |
| 3,880,626 | 4/1975 | Griwatz et al. | 55/497 |
| 4,042,358 | 8/1977 | Frohmader | 55/497 |
| 4,151,095 | 4/1979 | Wright | 55/497 |
| 4,187,182 | 2/1980 | Rosenberg | 210/493.3 |
| 4,267,044 | 5/1981 | Kroplinski et al. | 210/493.5 |

FOREIGN PATENT DOCUMENTS

| 752094 | 12/1970 | Belgium | 210/493.3 |
|---|---|---|---|
| 2812078 | 10/1978 | Fed. Rep. of Germany ... | 210/493.3 |

Primary Examiner—Richard V. Fisher
Assistant Examiner—Wanda L. Millard
Attorney, Agent, or Firm—Eric P. Schellin

[57] ABSTRACT

A replaceable, rectangular, flat, selectively permeable filter element (1) for the framelike section (27, 30) of a sheet filter device (20) consisting of metal and/or hard plastic for the filtration of fluids (liquid and/or gas) can be clamped in by its edge in a leak-proof manner and like a sandwich between a housing part (30) on the sediment chamber side and a housing part (27) on the filtrate chamber side and supported against the pressure gradient on a draining housing support plate (27), whereby the sediment chamber and the filtrate chamber are provided with connections (22, 25) for supplying and emptying the housing chambers. The flat filter element (1) is formed by a flat filter band pleated into a plurality of close folds and adapted to the inside dimension of a hollow chamber (30) in length, width and depth, whereby it essentially fills up this inside dimension, whereby the open folds and the web backs of one side of the pleating face the sediment chamber (41) and the open folds and the web backs of the other side face the filtrate chamber (47), and the pleating, formed to a flat cuboid (plate), of the filter band blank constructed with at least one layer is surrounded in a frame-like manner by a plastic seal (6) and the latter is provided with a formed sealing flange (7) with which the filter cassette can be clamped in a leakproof manner between the housing parts. The pleating is covered on both sides by a support grid (10, 11) whose edges are anchored in order to brace the filter cassette in the material of the seal (6) and/or of the sealing flange (7).

15 Claims, 19 Drawing Figures

FLAT FILTER ELEMENT FOR THE FILTRATION OF FLUIDS

The invention is relative to a replaceable, flat, selectively permeable filter element for a flat filter housing for the filtration of fluids in the pharmaceutical, cosmetic, photographic, sugar and canning industries as well as for filtration in biochemistry, in the beverage and food industries and for the filtration of chemotechnical products. The invention is of the type of filter element which is held by its edge like a sandwich and in a sealing manner between a housing part with a sediment chamber (retentate chamber) and a housing part with a filtrate chamber (permeate chamber) and is supported in a draining manner against the pressure gradient, whereby sediment chamber and filtrate chamber are provided with connections for supplying and emptying the housing chambers, and in which at least one housing part comprises a disk-shaped free space for housing filter means or auxiliary filter means. Mono or multilayer flat filter blanks in the form of straining cloths, deep-bed filters, membrane filters and other filter media in combination with auxiliary filter means such as matting filters consisting of diatomaceous earth or of cellulose are employed in these industrial systems for the above-named industries. See also U.S. Pat. No. 3,520,803 and DE-AS No. 2,145,661 for the state of the art.

Such devices are made of coated aluminum, high-grade steel and/or hard plastic, e.g., nylon in order to resist aggressive fluids and to be reusable, which makes them quite expensive. The expendable materials are considered to be the replaceable filter means and auxiliary filter means. In order to be able to filter the large amounts of fluids, a plurality of sections of the devices must be used to achieve a sufficient total filter surface, since, in accordance with the previous known usage, when both sides of a filter plate are coated, the filter surface of one section corresponds basically only to approximately the surfaces of both sides of this filter plate.

In addition to these industrial systems, filter devices constructed in plates are also known in which distributor and support plates are permanently connected to ultrafiltration membranes and can be clamped as a cassette between housing end plates in accordance with DE-OS No. 31 27 584. Laboratory devices are also known for the filtration of lesser amounts of liquids, especially for ultrafiltration, which consist of an upper housing part and a lower housing part consisting of metal between which a flat filter blank, also in the form of an ultrafilter membrane and optionally in combination with a preliminary filter, can be held like a sandwich. Such devices are known, for example, from DE-OS No. 28 25 441 and DE-OS No. 32 00 443.

The invention therefore has the task of expanding and more effectively utilizing filter housings consisting of metal and/or hard plastic used in the areas indicated above with simple means and with the specifications of construction indicated in the pre-characterizing clauses of the main and of the subclaims, without having to make any basic change in their construction, as regards their use in filtration by means of a special filter element without making it more difficult, and, if possible, making it easier to load the filter devices in comparison with past practice.

The invention solves this task essentially as follows: The special filter element for use in the above-named housing specifications is formed from a flat filter band blank constructed in at least one layer which is pleated to a flat, platelike cuboid and is provided on its periphery with a framelike border of sealing material and with an integrated, peripheral sealing flange with which the side of the pleating facing the sediment chamber is sealingly separated from the side of the pleating facing the filtrate chamber inside the filter element and can be sealingly held between the peripheral edges of two housing sections with the aid of the peripheral sealing flange. The special construction is indicated in the main claim and in the independent claims. Advantageous embodiments are presented in the subclaims.

The inventive approach to the task and the solution takes into consideration a state of the art in which an enlargement of the filter surface by folding the filter element is possible by constructive measures, as is taught, for example, by GB No. 1,477,779; DE-OS No. 31 43 542 and DE-OS No. 31 28 546.

The general concept of the invention and its special realizations are explained in more detail in several embodiments with reference made to the schematic drawings.

Figure 1:
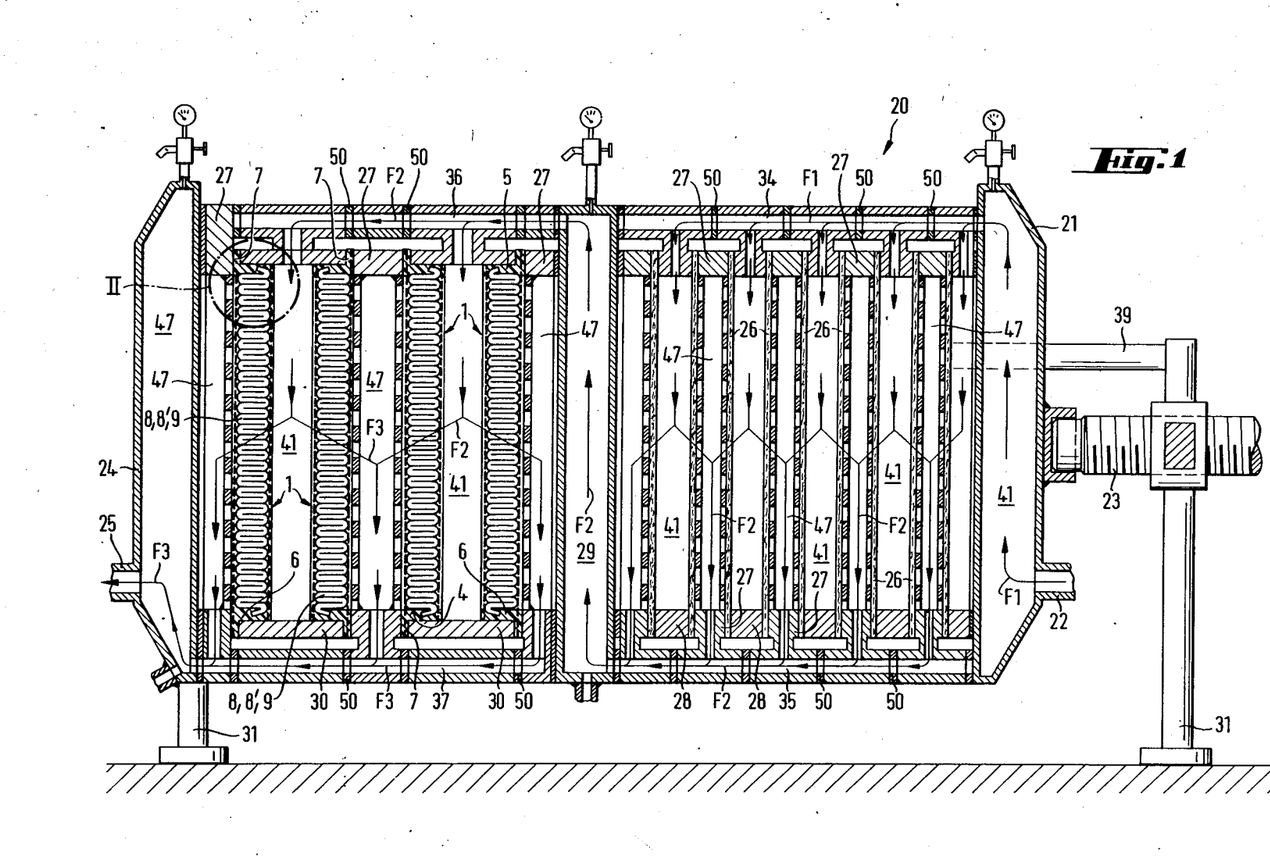
FIG. 1 schematically shows a vertical longitudinal section through an industrial filter system provided with traditional straining cloths (right) and with pleated filter elements (left).

The filter device of FIG. 1 has, as concerns its housing construction parts, a state-of-the-art construction such as was initially described and is also partially described in DE-OS No. 28 26 781.

Filter device 20, which is constructed as an industrial upright device, comprises a plurality of housing sections. They basically consist of stationary cover 24 and loose cover 21 which are provided with a plurality of connections 22, 25 for supplying and emptying fluids F1 to F3. Movable housing sections 21, 27, 28, 29, 30 are mounted on horizontal crossbeams 39, sectionally sealed by O-ring seals 50 in the area of supply and emptying lines 34 to 37 and sealed on the edges by the filter elements. The sections provided with filter elements are sealingly pressed via central spindle drive 23 or a hydraulic aggregate.

In order to explain the concept of the invention, the right half of the device is provided with customary sheet filters 26 as straining cloths, whereby double-walled, sievelike support plate 27 is covered on both sides with straining cloths or sheet filters 26 and the free space formed by sieve plates 27 forms a section of the entire filtrate chamber 47 and a housing section constructed as hollow frame 28 in part of sediment chamber 41.

Several of these sections 27, 28 are connected in parallel as regards the flow by lines 34, 35 and filtrate chamber 47 empties into deflection chamber 29, so that filtrate F2 or the preliminary filtrate is deflected into the second housing half and is introduced into two sediment frames 30 whhich are each provided with two pleated filter elements 1 and the latter are supported against the pressure gradient on filtrate side F3 on double-walled sieve plates 27. The seal of filter elements 1 with housing sections 27, 30 is established by peripheral flange seals 7, while the seal of the line sections is established by customary O-ring seals 50. As can be seen right from the schematic drawing of FIG. 1, the pleating makes possible a multiple housing of filter surface in comparison to the simple arrangement of the state-of-the-art, as is shown on the right in the filter device.

Figure 2:
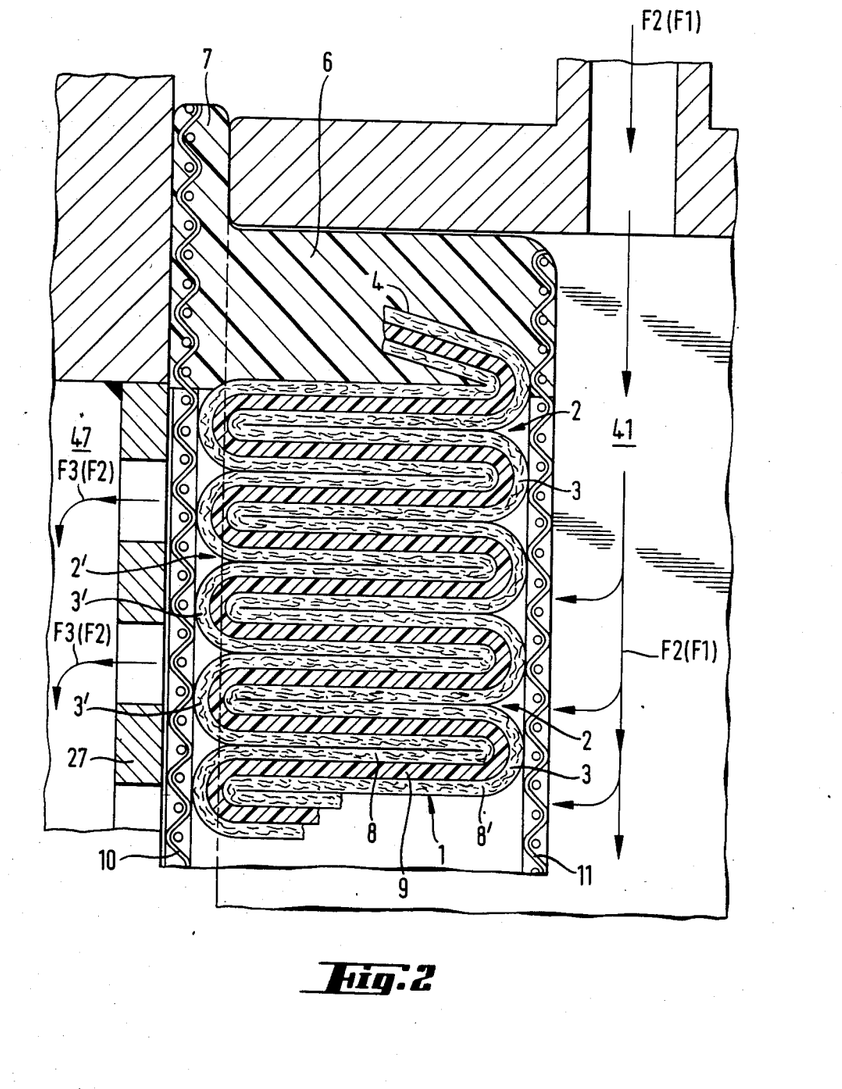
FIG. 2 shows a detailed section of the edge formation of the filter element and its clamping between two housing sections.

Filter element 1 in FIG. 2 consists of at least one layer, but preferably of several layers of flat filter band blanks 8, 8', 9 which are stepped so as to aid the filtration, stacked in a covering manner onto each other and are pleated conjointly into a plurality of folds. The flat filter band is constructed in several layers constituting a bed filter and consists of a microporous filtration membrane (9) covered on bath sides by a filter fleece and/or support fleece (8, 8') and with a pore size of 0.05 to 3 $\mu$m or cut-off of 5,000–100,000 which forms the common pleating. The total thickness of filter element 1 is a function of the free available dimension of hollow frames 30 and of the sediment frames. Open folds 2 and web backs 3, located in a plane, of the one pleating side face sediment chamber 41 and fold openings 2' and web backs 3' of the other pleating side face filtrate chamber 47 and are supported against the pressure gradient on sieve plate 27. The pleating, which is formed into a cuboid, is encompassed on the front (5) and on the side (4) by plastic seal 6, whereby the pleating is strengthened and supported preferably on both sides but at least on the sediment chamber side by fabric support layers 11 and 10 integrated into the plastic of seal 6. Formed, peripheral sealing flange 7 is also an integral constituent of seal 6. This flange is preferably strengthened by support grid 10 of monofil plastic threads (fabric), so that the pleating is combined by support grids 10, 11 and seal 6, 7 to an easily manageable cassette-like filter element and so that even filter devices with large-surface filter sections can be equipped therewith.

Figure 3:
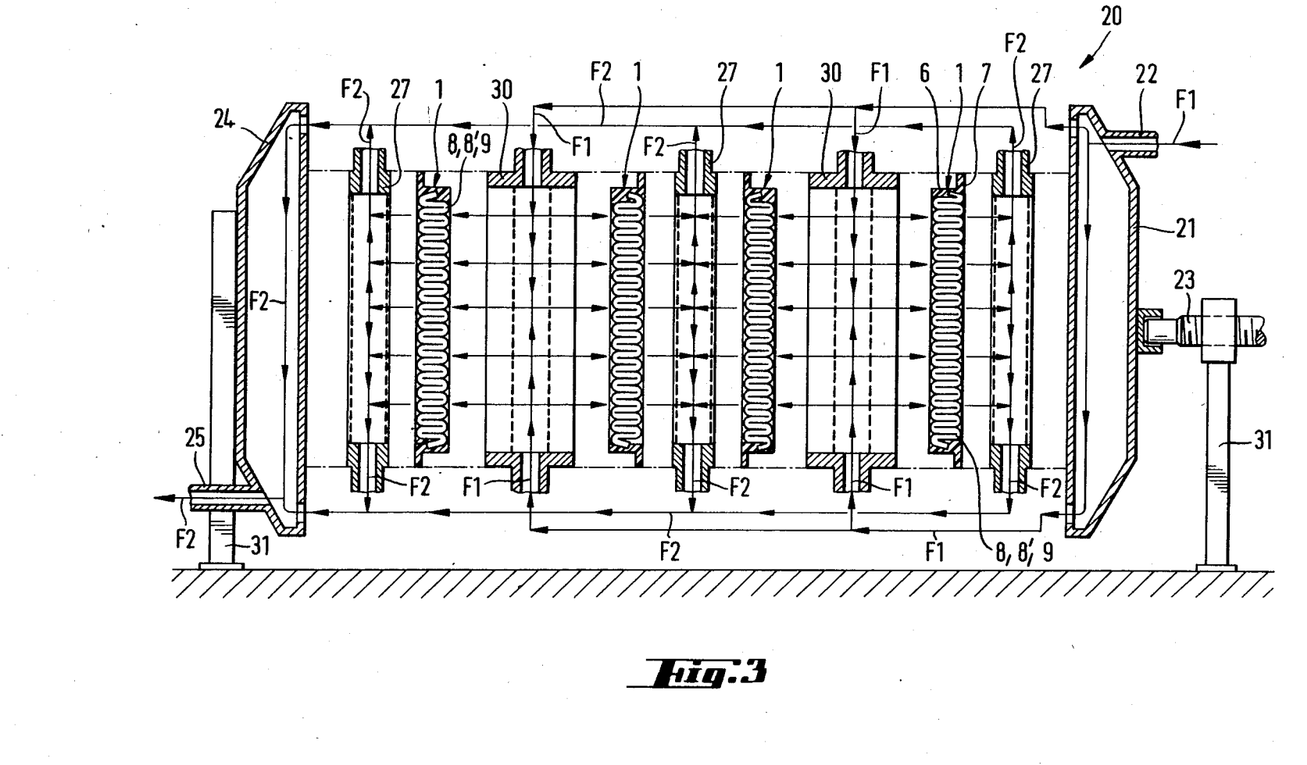
FIG. 3 schematically shows a vertical longitudinal section through a filter device with pleated filter elements and exploded individual parts.

FIG. 3 shows the usage of pleated filter element 1 in filter device 20 in accordance with FIG. 1 which is equipped only with draining support plates 27 and sediment frame 30. The sediment F1 or preliminary filtrate F1 flows in parallel through sediment frame 30 through filter elements 1 supported on support plates 27. Fluid F1 leaves device 20 via connection 25 in fixed cover 24 as filtrate F2. It is evident in this figure too that this special design for the device is made more economical to use by the use of pleated filter elements 1, without changes in the design of the device being necessary and without the individual construction parts being more difficult to handle due to the use of the pleated filter element in cassette form. The customarily square housing sections have dimensions of between 20 cm and 100 cm side length.

Figure 4:
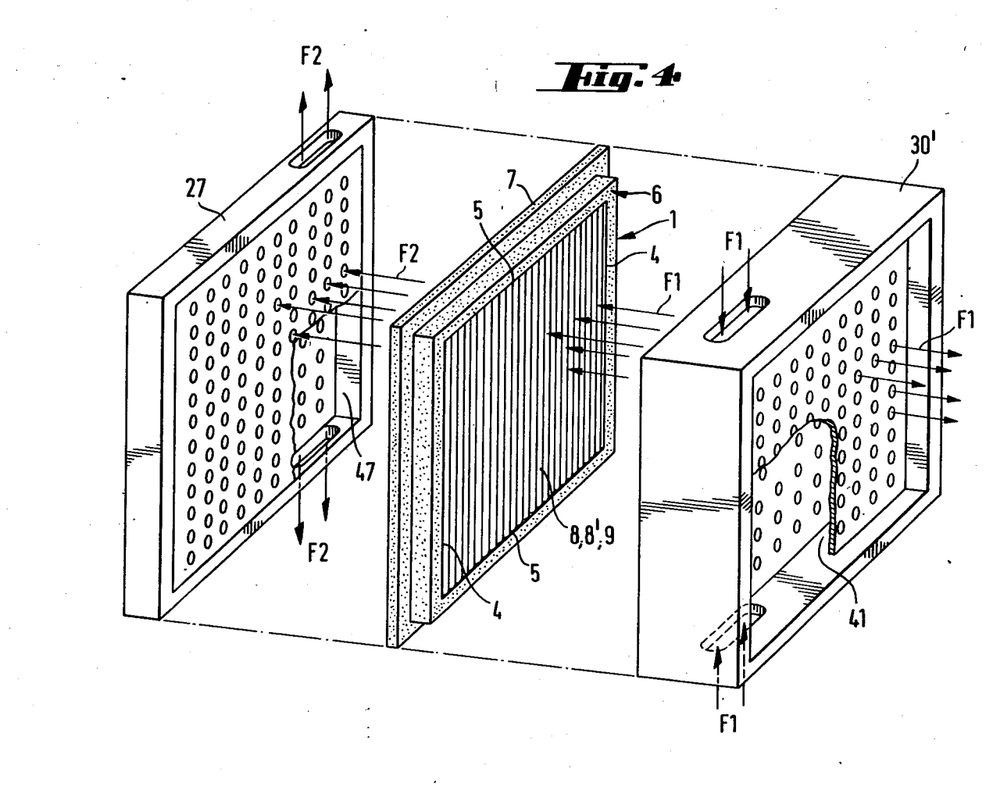
FIG. 4 is a simplified and perspective view of the filter element, which can be clamped between two housing sections.
Figure 5:
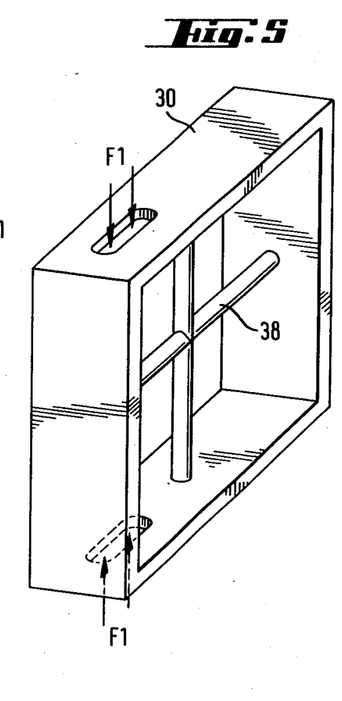
FIG. 5 shows a corresponding view of a variant of a state-of-the-art sediment frame.
Figure 11:
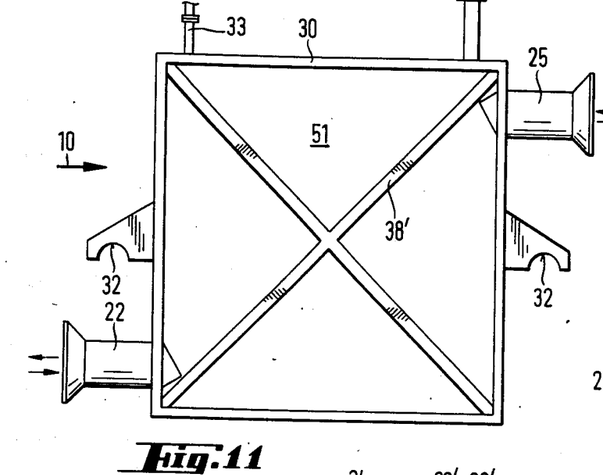

Sediment frame 30' can be constructed similarly to double-walled sieve or support plate 27 in FIG. 4 or as simple hollow frame 30 in accordance with FIG. 5 with cross-shaped bracing 38 or with diagonal braces 38' (FIG. 11).

Figure 6:
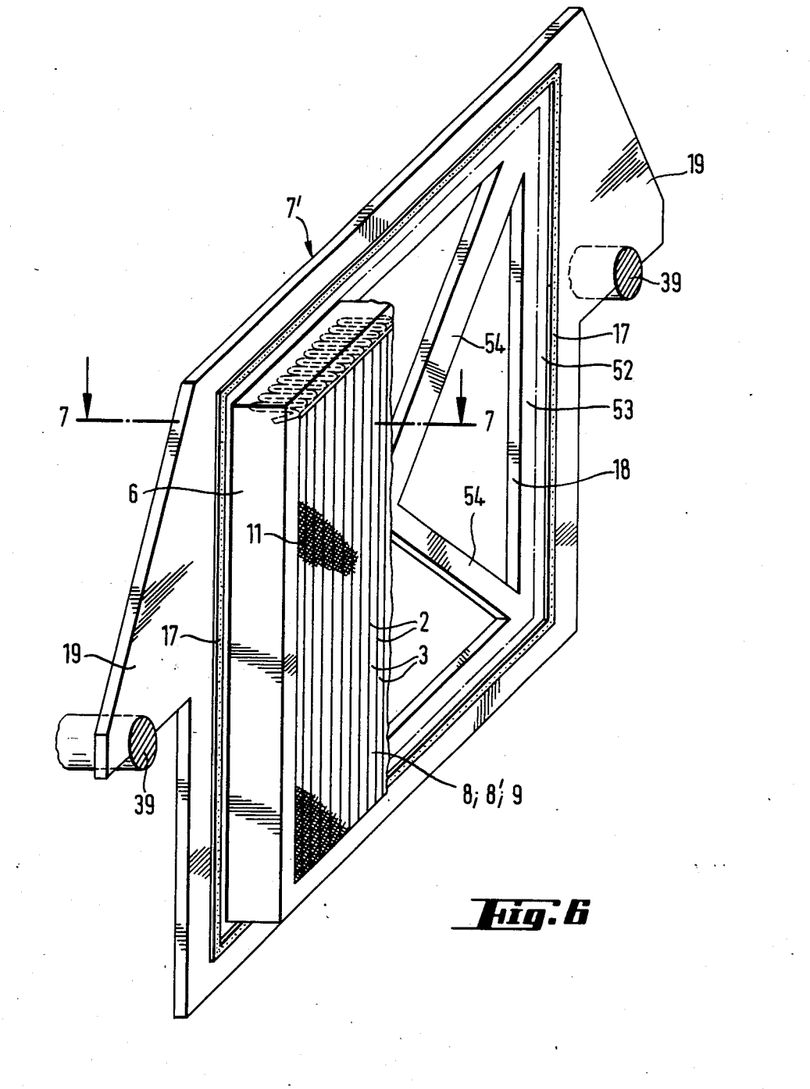
FIG. 6 shows a perspective view of a preferred embodiment of a filter element.
Figure 7:
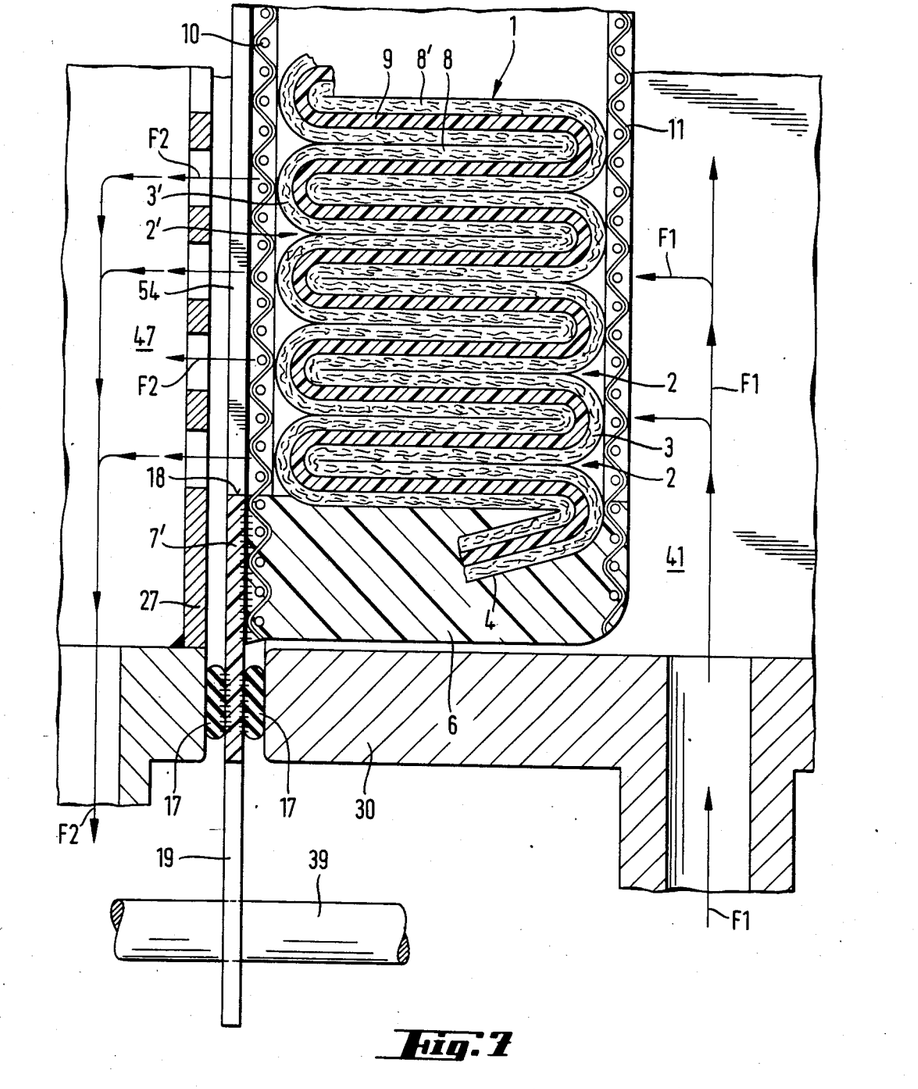
FIG. 7 corresponds to the view in FIG. 2 and shows a section through the filter element of FIG. 6 and its insertion between two housing sections.

The filter cassette shown in FIGS. 6 and 7 is a preferred embodiment for the manufacture and the manipulation. In contrast to the previously described embodiment shown in FIG. 2, the sealing flange is formed by thin-walled plastic frame 7' consisting of hard plastic which comprises opening 18 adapted to the exposed pleating. Flange area 53 facing opening 18 is permanently and sealingly connected to peripheral seal 6 with inclusion of any support layer 10 present, e.g. by sealing, welding or adhesion, whereby it is advantageous if the plastic of frame 7' and that of seal 6 are of the same family, e.g. if they consist of polypropylene.

Peripheral flange area 52 of plastic frame 7' is coated on both sides with long-life elastic sealing strip 1.7 which forms peripheral contact surfaces and sealing surfaces in the peripheral direction of plastic frame 7' for housing parts 27, 30 to be sealed.

The total thickness of plastic frame 7' and of the two sealing strips 17' is dimensioned so that they have the same thickness in a pressed state as the filter layers or straining cloths which are customarily sealingly pressed and the edges between housing parts 27, 30.

In order to achieve a better manipulation, adjusting and fixing of the filter element with reference to the opening of sediment frame 30 and with reference to the contact surfaces for sealing strips 17 on housing sections 27, 30, laterally projecting guide noses 19 are integrated into plastic frame 17' on two opposite sides which guide and support the filter element as well as housing sections 27, 30 on horizontal bed crossbeams 39 during assembly and disassembly.

In large filter cassettes with a side length of 60 to 100 cm opening 18 of plastic frame 7' is latticed and braced by webs 54 running diagonally or obliquely to folds 2, 3. The entire plastic frame 7' is preferably constructed in a single piece as an extruded part or as a plate stamped part.

The filter devices and filter elements shown in FIGS. 8 to 14 are limited in their size on the housing side to a three-part basic unit and rather small dimensions.

Figure 8:
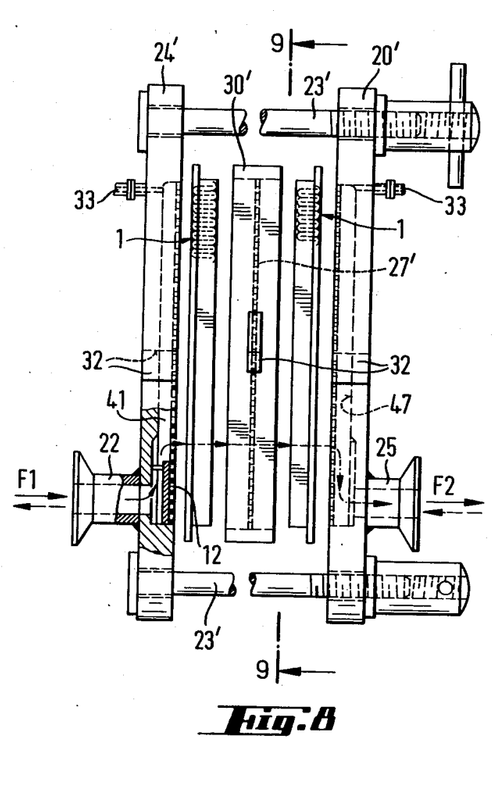
FIG. 8 shows a side view of the basic unit of a modified filter development with two filter elements in series.
Figure 9:
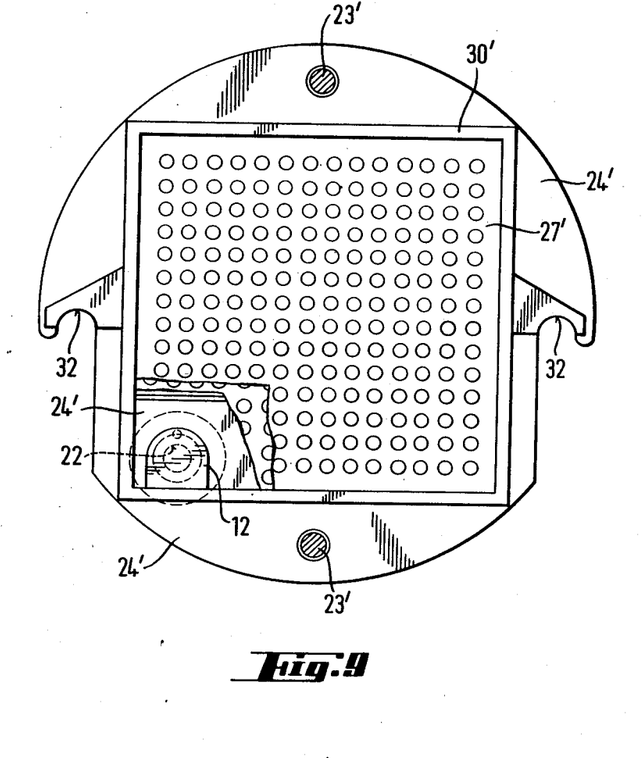
FIG. 9 shows the front view of a housing end plate and of a hollow frame with filter support according to FIG. 8.

The filter device of FIGS. 8 and 9 consists of two round head plates 20', 24' and of a hollow frame 30' with central sieve plate 27' on which a filter element 1 on each of the two sides is supported and seals the three housing parts 24' 20' and 30' on the edges. The construction parts assembled in this manner can be tightened via clamp bolts 23' hollow frame 30' is suspended by support hooks 32 on horizontal guide bolts. Head plates 24' and 20' of the device are each provided with at least one connection 22 or 25 and with one ventilation connection 33. Baffle plate 12 in sediment chamber 41 is positioned in the area of inlet piece 22 for the sediment for the protection of filter element 1. Left filter element 1 serves for a preliminary filtration, while right filter element 1 serves, e.g., for refiltration or sterile filtration.

Figure 10:
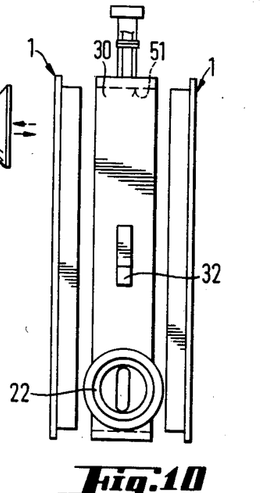
FIGS. 10 and 11 show other variants to FIG. 8 and 9 in a corresponding view.

The variant of FIGS. 10 and 11 exhibits a hollow frame 30 shown in perspective like in FIG. 4 and also two diagonally positioned media connections 22, 25 which supply and empty hollow chamber 51 between the two filter elements 1, so that both filter elements 1 are supplied with pressurized fluid for hollow frame 30 and filter elements 1 are accordingly supported on the draining housing and plates (not shown) like 24' and 20' in accordance with FIGS. 8, 9.

Figure 12:
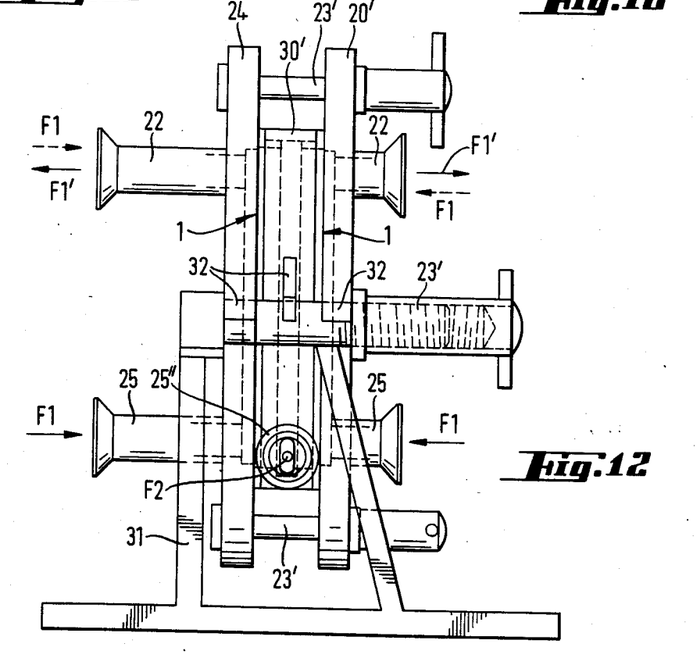
FIG. 12 shows a filter device assembled ready for operation which is suitable for static and dynamic filtration.
Figure 13:
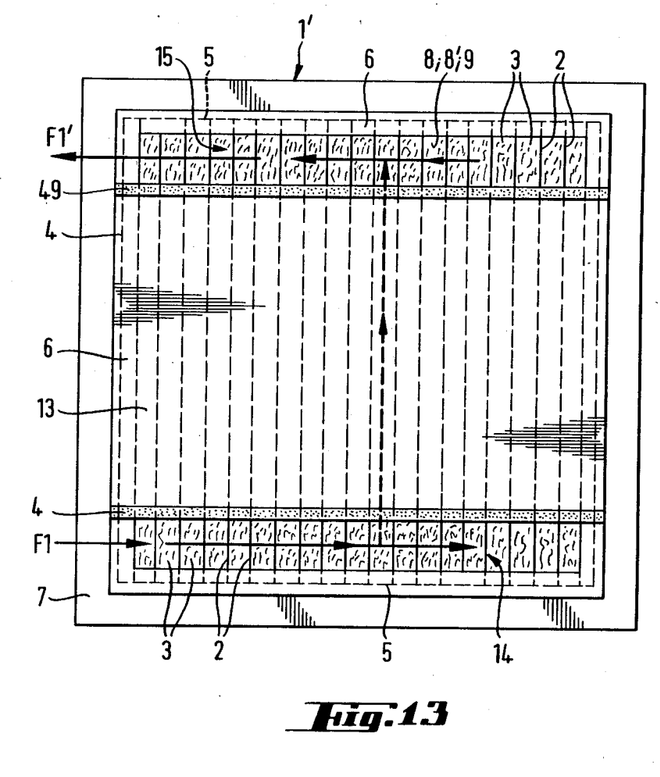
FIG. 13 shows a top view of a modified filter element, especially for ultrafiltration.

In the construction of the device according to FIG. 12, housing and plates 24' and 20', which are each provided with two connections 27,25, are mounted together with hollow frame 30', as shown in principle in FIG. 4, to stand 31 and can be tightened to one another by clamp bolts 23'. When modified filter element 1' of FIG. 13 is used, both filter elements 1' for microfiltraton or for ultrafiltration can be flowed over dynamically, whereby filtrate F2 from the opposing sides of filter element 1' can be drawn off via connection 25" from hollow frame 30'. Sediment F1 enters into both connections 25 and leaves both connections 22 as concentrate F1', while filtrate F2 leaves the housing via connection 25".

Figure 14:
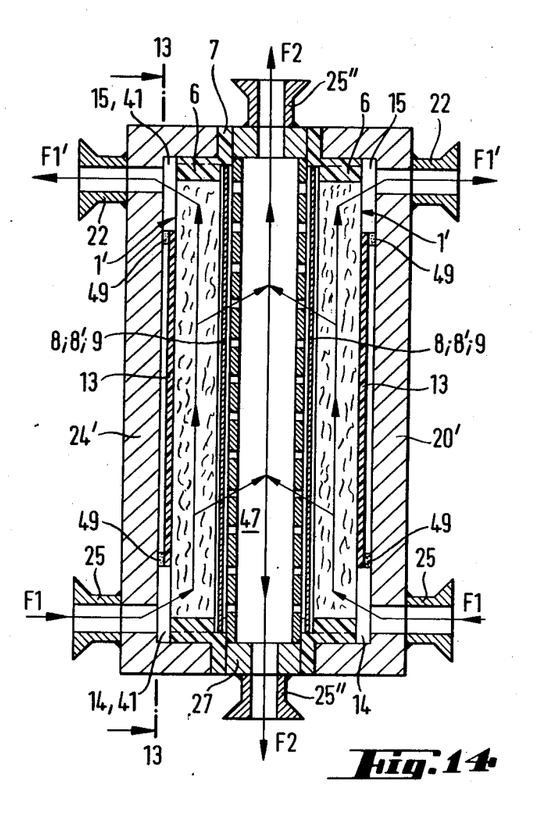
FIG. 14 shows a section through the filter element of FIG. 13 and its insertion in a housing for dynamic filtration.

According to FIG. 13, the filter element 1' required for this consists of a filter element as already described. It is supplemented by flow barrier 13 which runs obliquely to web backs 3 and fold openings 2, is permanently connected, for example, in the form of a fluid-tight cover to seal 6 of the two end fold webs 4 of the pleating and leaves distributor conduit 14 and collector conduit 15 free on both sides of seal 6 on both front sides 5 of the pleating, so that sediment F1 enters in accordance with FIG. 14 shown in section via connection 25 into distributor conduit 14 and is forced by flow barrier 13 resting against housing plate 24' to penetrate into the depths of the folds, to flow over the filter surface toward collector conduit 15 and to exit again from housing plate 24' as concentrate F1' (connection 22). The other filter element 1' is supplied and emptied on a housing plate 20' via connections 25 and 22 in a corresponding manner. Filtrate F2 of both filter elements 1' is taken off out of central connection 25".

Two sealing beads 49 assure that flow barrier 13 contacts housing 20, 24' in a sealing manner.

FIG. 14 shows a vertical section through a housing variant in which housing part 24' receives the sediment chamber and housing part 27 forms the double-walled support plate. The device can be completed by another housing part 24, therewith taking two filter elements 1'. Sediment F1 is forced by flow barrier 13 and sealing beads 49 to penetrate into the depths of the folds and to flow over the folds.

Such a dynamic guiding of the flow is particularly necessary for ultrafiltration in order to prevent a too rapid clogging of the microporous filter membranes.

Figure 15:
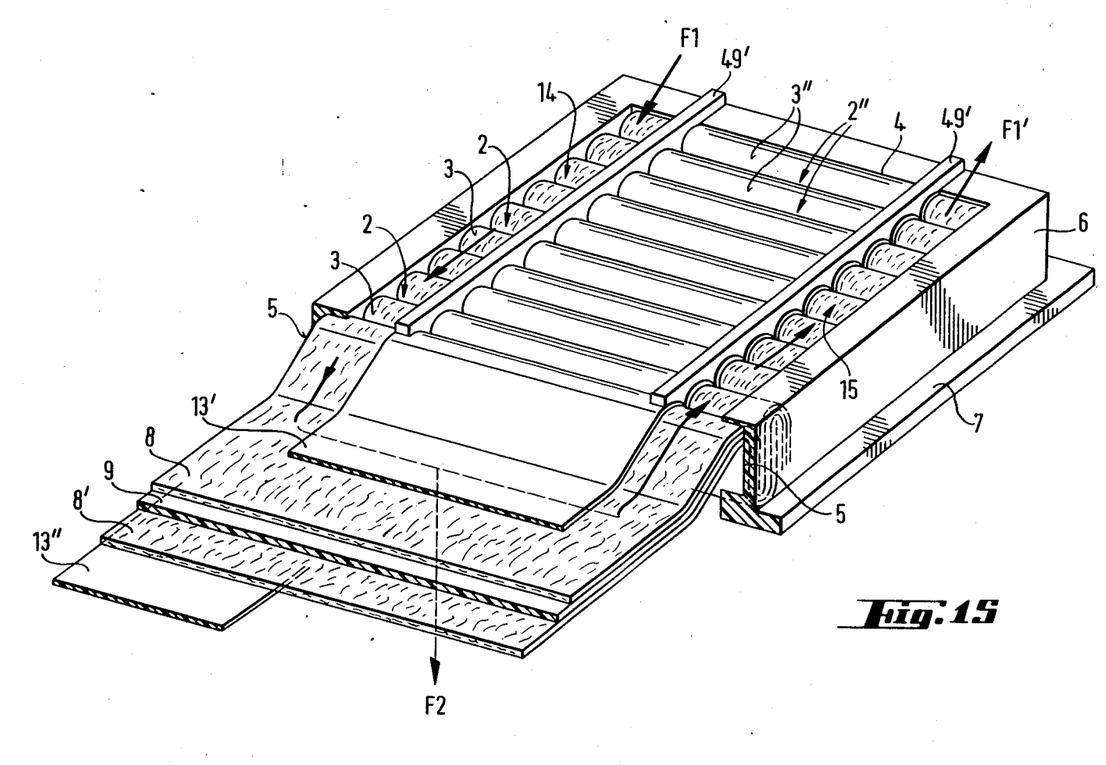
FIG. 15 shows a perspective view with fanned-out pleating of a variant of the filter element of FIGS. 13 and 14 suitable for ultrafiltration and microfiltration.

FIG. 15 shows a variant of the filter element of FIG. 13. Fluid-tight foil 13' is likewise shortened on both sides in relation to the main pleating, yet is a part of this pleating. Upper fold opening 2" and web back 3" of foil 13' are covered with sealing beads 49'.

It can also be advantageous for microfiltration to force a certain guiding of the flow. This can be accomplished by banking the filtrate flow.

FIG. 15 shows the arangement of foil strip 13" on the filtrate chamber side of the filter element in the area opposite distribution conduit 14. Foil strip 13" can be pleated either as at 13 as a covering or as at 13'. The filtrate flow is braked in the foil area, so that a back-up occurs and a too rapid clogging of the filter element on the sediment side is prevented.

Figures 16, 18, 19:
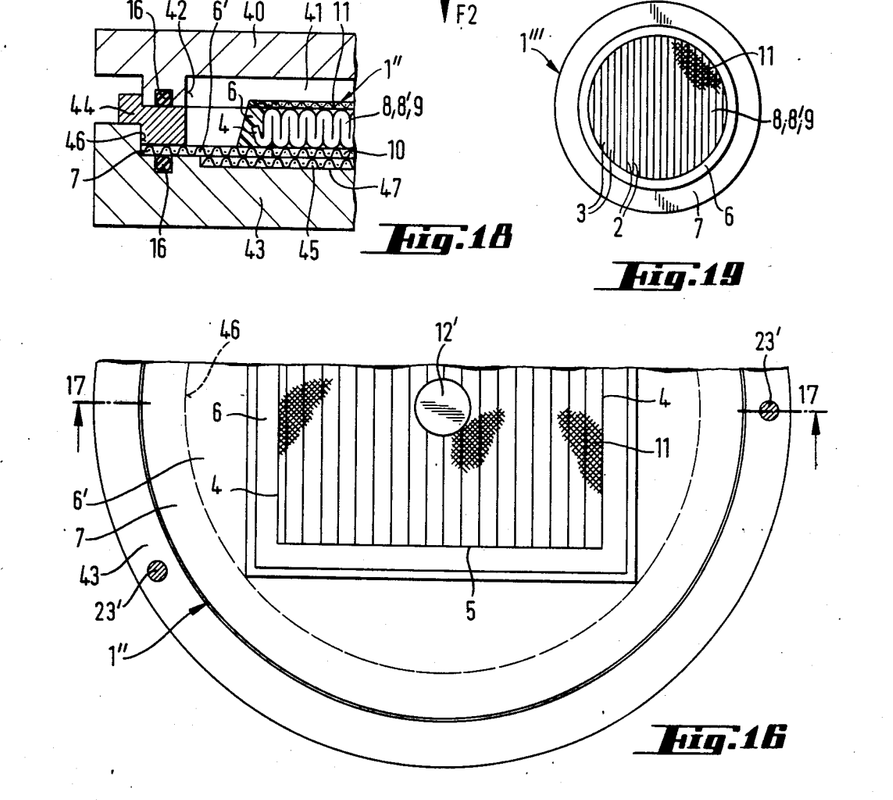
FIG. 16 shows a top view of a circular bottom of a filter housing with inserted square filter element and circular sealing flange.
FIG. 18 shows a vertical section through a filter housing edge in accordance with FIG. 17 with additional intermediate ring and modified filter element.
FIG. 19 shows a top view of a modified filter element for use in a round flat filter device or a round housing section.

FIGS. 16 to 19 show filter elements 1" and 1'" for circular flat filter devices such as are known in the art in accordance with DE-PS No. 28 25 441 and DE-OS No. 32 00 443. They consist of a housing upper part 40 and a housing lower part 43 provided with support feet 31, usually of high-grade steel, which are provided with connections 22 and 25 and other connections. The former comprise indents 42, 46 which form the sediment chamber 41 and the filtrate chamber 47. The interlocking flanges are provided with O-ring seals 16 and clamp a circular flat filter element in a sealing manner in between the two housing parts 40 and 43. Indents 42,46 also have the function of already supporting the circular flat filter blank on both sides by means of a draining support construction. The free spaces of the two housing parts 40,43 formed by indents 42,46 can accordingly also be provided with a folded filter element 1" in conformity with the concept of the invention in order, for example, to achieve greater filtration amounts and a longer service life of the filter element. The filter element of FIG. 16 is formed by a rectangular flat filter band blank which is pleated to a cuboid disk, so that the finished pleating practically forms an inscribed square in the smallest circular indent 42,46 and is provided with peripheral seal 6 which merges into flange segments 6' and peripheral sealing flange 7 and is integrated with support grids 11,10 on both sides. Flange segments 6' should be supported, if required, against the pressure gradient, especially in the embodiment of FIG. 14, in which sealing flange 6',7 is positioned approximately at the mid pleating height. Such a flat filter device can be provided both with flat filter blanks and the already extant filter supports in accordance with the state of the art or also with pleated filter element 1" without this requiring a constructional change.

FIG. 18 shows a variant in which filter element 1" is provided with a sealing flange 6',7 located in the lower pleating plane. Filter element 1" can be supported, if required, by additional draining filter support 45. Sediment chamber 41 necessary for the pleating height is broadened by intermediate ring 44 in addition to indent 42. The embodiment of filter element 1" in accordance with FIGS. 16,17 and 18 can be manufactured without clipping. If a slight clipping is justifiable for reasons of economy or of manufacture, the pleating for the circular or oval housing indent can also be produced as an inscribed square or rectangle which is then reduced to the specified size by stamping and is provided with peripheral seal 6 with sealing flange 7, which seal is adapted to the housing indent or to the hollow frame.

Figure 17:
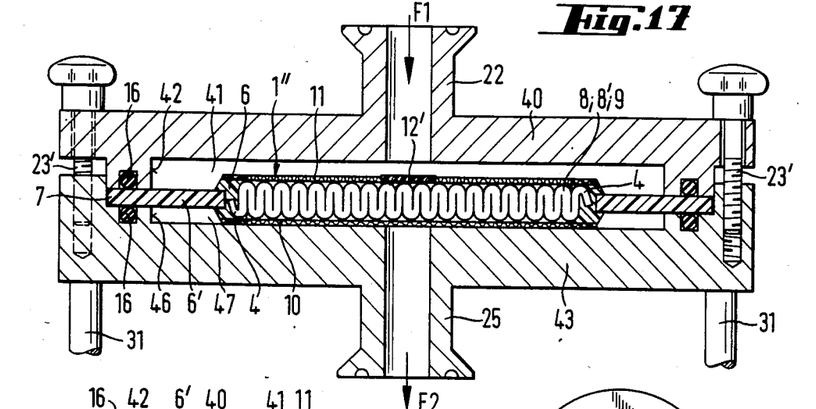
FIG. 17 shows a vertical section through a round and flat filter housing in accordance with FIG. 16 along line 17—17.

Such flat filter housings in accordance with FIG. 17 are usually provided near their inlet 22 with a baffle plate screwed to the underside of indent 42 with axial spacing, similar to 12 in FIG. 8, in order to prevent loading the filter element too heavily directly under inlet piece 22. Baffle plate 12' can also be a constituent of filter element 1'' or 1''' instead of baffle plate 12 on the housing side by filling support grid 11 in this area under inlet 22 with a sealing mass. The size and shape of baffle plate 12' are adapted in this instance to the cross section of inlet piece 22.

It is quite easy to provide even flat filter devices of this type with pleated filter element 1'' or 1''', and the filtration devices whose preformance was previously unsatisfactorily expensive for large filtration amounts on account of the small filter surface can now be utilized in a more versatile and economical manner with the pleated filter element.

All embodiments have the advantage in common that sealing flange 7, 7' prevents the radial leakage losses common in sheet filters and prevents a sticking to the sealing edges of housing parts 30, 27. The cleaning of clinging filter layer residue from housing parts 30, 27 which is customary when using sheet filters can be eliminated with the filter element construction of the invention.

We claim:

1. In a filter element for equipping framelike sections of a sheet filter device for filtration of flowing fluids, wherein a filter element is clamped by its edge in a leakproof and sandwichlike manner between a housing part on a sediment chamber side and a housing part on a filtrate chamber side, and is supported against a pressure gradient on a draining housing support plate whereby said sediment chamber and said filtrate chamber are provided with connections for supplying and emptying housing chambers, the improvement wherein said filter element is characterized by a replaceable flat selectively permeable filter element (1) formed by a flat filter band with parallel folds of folding openings (2, 2') and, web backs (3, 3') said flat filter band is adapted to inner dimensions of a housing part (30) in length, width and depth and is pleated into a plurality of close folds, in which open folds (2) and web backs (3) of one side of a pleating face of a sediment chamber and open folds (2') and web backs (3') of a second side face of a filtrate chamber and the pleating of at least a single-layer filter band blank (8, 8', 9), which pleating is formed to a flat cuboid is bordered in a framelike manner by a plastic seal on an edge to form a leakproof separation of sediment chamber (41) from filtrate chamber (47), said seal circumferentially surrounds two end fold sections (4) of said pleating and two front sides (5) of said pleating, and is provided with a plastic formed sealing flange (7) with which a filter cassette is formed and is clamped between housing parts (27, 30), and whereby support gridwork (10, 11) or foils (13', 13'') running transversally to fold edges are anchored at least on one side of the filter element (1) by their ends in two sides of circumferential plastic seal (6) located opposite one another and running parallel to the fold edges for stability and to influence flow.

2. Filter element according to claim 1, characterized in that pleating of a free filter area on the sediment chamber side comprises a fluidtight cover (13) as a flow barrier for dynamic overflow of filter element (1) for ultrafiltration, which cover runs at edges parallel at a distance to seal on two front sides (5) of the pleating and is held in seal (6) of end fold sections (4), whereby two free spaces between the two edges of the flow barrier and a sealing edge of front sides (5) of the pleating form a distributor conduit (14) running transversally to the pleating to form a corresponding collector conduit for pulp.

3. Filter element according to claim 2, characterized in that the fluidtight cover follows the pleating as a cover layer and flow barrier in the form of a foil (13') and fold opening (2'') and web backs (3'') of the foil (13') in contact with each other in a sealing manner and at least the edge area of the foil (13') facing distributor conduit (14) is sealed against said distributor conduit by sealing beads (49') which obliquely covers web backs (3'') and with which the side of the flow barrier facing the sediment chamber (41) is sealingly supported on the housing.

4. Filter element according to claim 3, characterized in that, for microfiltration, a foil strip (13'') is pleated into a folding as an edge strip and additional baffle plate on the side facing the filtrate chamber (47), which foil strip (13') covers the area of folding associated with the distributor conduit (14) on the filtrate flow side and dams up direct filtrate flow in the covered area.

5. A replaceable, flat, selectively permeable filter element for equipping a flat filter housing for filtration of fluids, whereby said filter element is clamped by its edge in a leakproof and sandwichlike manner between a housing part with sediment chamber and a housing part with filtrate chamber and is supported against a pressure gradient in a draining manner, whereby the sediment chamber and the filtrate chamber are provided with connections for supplying and emptying housing chambers and in which at least one housing part comprises a circular indent for forming the sediment chamber separate from the filtrate chamber, characterized in that the flat filter element (1'') and its filtering area consists of an inner square adapted to small circular indent (42, 46) of a housing part (40, 43) and is formed by a flat filter band blank (8, 8', 9) adapted to one square side, which blank is pleated in a plurality of close parallel folds consisting of fold openings (2, 2') and fold bridges, whereby the open folds (2) and the web backs (3) of one side of a pleating side face the sediment chamber (41) and the open folds (2') and the web backs (3') of the other side face of the filtrate chamber (47), and the pleating of at least single-layer flat filter band blank (8, 8', 9), which pleating is formed to a flat cuboid (plate), is bordered in a framelike manner by a plastic seal on an edge in order to form a leakproof separation of the sediment chamber (41) from the filtrate chamber (47), which seal circumferentially surrounds two end fold sections (4) of the pleating and two front sides (5) of the pleating and is provided with a plastic formed sealing flange (7) with which filter element (1'') is clamped between the housing parts (40, 43), whereby grid work (10, 11) running transversally to fold edges are anchored at least on one side of the filter element (1'') by their edges in the circumferential plastic seal (6) for stability.

6. Filter element according to claim 5, characterized in that the sealing flange (7) of the filter element is formed by a circumferential thin-walled plastic frame comprising an opening and consisting of a non-compressable hard plastic, whose flange area (53) facing opening (18) is permanently and sealingly connected to a circumferential area of peripheral seal (6) and whose peripheral flange area (52) is covered on both sides with a permanently elastic sealing strip, which forms circumferential contact surfaces for housing parts (27, 30) to be sealed in the circumferential direction of the plastic frame (7').

7. Filter element according to claim 6, characterized in that plastic frame (7') and the peripheral seal (6) framing the pleating belong to the same family of plastics and the connection of the two parts (6, 7') is established by sealing, welding or adhering.

8. Filter element according to claim 6, characterized in that plastic frame (7') comprises integrated guide noses (19) which project laterally on opposite sides for fixing the pleating integrated with the frame (7') to housing frame crossbeams (39).

9. Filter element according to claim 6, characterized in that in said plastic frames (7') opening (18) is screened by webs (54) on the area of the plastic frame (7') covering the free filter area and is formed as a perforated plate.

10. Filter element according to claim 5, characterized in that the flat filter band is multilayered and is formed by a microporous filtration membrane (9) with a pore size of 0.05 μm to 3 μm or a cut off of 5,000–100,000 covered on both sides by a filter and/or support fleece (8, 8') which form common pleating.

11. Filter element according to claim 10, characterized in that the flat filter band blank is multilayered and is formed by a deep-bed filter which is thin on the pulp side, and another deep-bed filter following downstream with a decreasing exclusion limit, a microporous filtration membrane, and by a draining support layer which protects them on the filtrate side.

12. Filter element according to claim 5, characterized in that sealing flange (7) is reinforced by said gridwork (10) of monofil plastic threads anchored in the plastic seal (6) and whose periphery forming the sealing flange (7) is encased by an elastic sealing mass which projects on both sides of a grid plane of the latter.

13. Filter element according to claim 12, characterized in that the sealing flange reinforcement formed by said gridwork (10, 11) is a component of a single-piece open grid cover of the pleating side facing the pulp chamber (41) or the filtrate chamber (47).

14. Filter element according to claim 5, characterized in that, in order to equip circular frame fields, a large area flat cuboid formed by the pleated filter band blank is reduced to a contour form adapted to the housing chamber and is supplemented by sealing flange (7) and plastic seal (6).

15. Filter element according to claim 5, characterized in that the side of the filter element (1'') facing the sediment chamber comprises an integrated baffle plate (12') which is formed as a fabric section of gridwork (11) filled with sealing means and is located in the vertical projection of an inlet piece (22) for the pulp and corresponds approximately to its cross sectional area.

* * * * *